United States Patent

Sugaya

(10) Patent No.: US 10,241,739 B2
(45) Date of Patent: Mar. 26, 2019

(54) SCREEN SHARING SYSTEM AND METHOD FOR SHARING SCREEN

(71) Applicant: OPTiM Corporation, Saga (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 373 days.

(21) Appl. No.: 15/000,107

(22) Filed: Jan. 19, 2016

(65) Prior Publication Data

US 2017/0109123 A1 Apr. 20, 2017

(30) Foreign Application Priority Data

Oct. 15, 2015 (JP) .................................. 2015-203580

(51) Int. Cl.
*G06F 3/048* (2013.01)
*G06F 3/14* (2006.01)
*H04N 21/41* (2011.01)
*G09G 5/12* (2006.01)

(52) U.S. Cl.
CPC ............. *G06F 3/1462* (2013.01); *G09G 5/12* (2013.01); *H04N 21/4122* (2013.01); *G09G 2320/06* (2013.01); *G09G 2370/02* (2013.01)

(58) Field of Classification Search
CPC .... G06F 3/1454; G06F 3/04883; G06F 3/038; H04L 67/12
See application file for complete search history.

(56) References Cited

U.S. PATENT DOCUMENTS

| 9,857,942 | B2 * | 1/2018 | Miao ................... G06F 3/04817 |
| 2013/0141517 | A1 * | 6/2013 | Shen ........................ H04N 7/15 348/14.03 |
| 2013/0332855 | A1 * | 12/2013 | Roman ................. G06F 3/0481 715/753 |
| 2014/0146190 | A1 * | 5/2014 | Mohammadi ......... A61M 35/00 348/207.2 |

(Continued)

FOREIGN PATENT DOCUMENTS

JP          11-327523          11/1999

OTHER PUBLICATIONS

Choong et al., Seamless presentation: A screen sharing system for WiFi network; 2015; IEEE; 5 pages.*

(Continued)

*Primary Examiner* — Linh K Pham
(74) *Attorney, Agent, or Firm* — Lex IP Meister, PLLC

(57) ABSTRACT

The present invention is to provide a screen sharing system and a method for sharing a screen which improve the convenience by changing screen data in a part of the display area of the shared screen in screen sharing. The system for screen a sharing 1 with a destination terminal 200 receives a specified area and an operation of a predetermined area or detects a moving area in a shared area where a screen is shared with the destination terminal 200; transmits request data to request a change of the received specified area and of the area corresponding to the received operation or the detected area to the destination terminal 200; receives response data responding to the request from the destination terminal 200; and changes and displays the specified area and the area corresponding to the received operation or the detected area based on the received response data.

22 Claims, 10 Drawing Sheets

(56) References Cited

U.S. PATENT DOCUMENTS

| | | | | |
|---|---|---|---|---|
| 2014/0240440 A1* | 8/2014 | Seo | ............... | H04L 51/04 |
| | | | | 348/14.03 |
| 2014/0289423 A1* | 9/2014 | Kim | ............... | H04L 65/80 |
| | | | | 709/233 |
| 2014/0330928 A1* | 11/2014 | Takehara | ............ | H04L 67/1095 |
| | | | | 709/217 |
| 2014/0365923 A1* | 12/2014 | Lee | ............... | G06F 3/017 |
| | | | | 715/758 |
| 2015/0009152 A1* | 1/2015 | Tang | ............... | G09G 5/12 |
| | | | | 345/173 |
| 2015/0227286 A1* | 8/2015 | Kang | ............ | H04M 1/0214 |
| | | | | 715/781 |
| 2015/0309766 A1* | 10/2015 | Huang | ............ | G06F 3/1462 |
| | | | | 345/2.2 |
| 2015/0379964 A1* | 12/2015 | Lee | ............... | G09G 5/12 |
| | | | | 345/173 |
| 2016/0188170 A1* | 6/2016 | Miao | ............... | G06F 3/04817 |
| | | | | 715/734 |
| 2016/0234276 A1* | 8/2016 | Ouyang | ............ | H04L 65/403 |
| 2016/0313969 A1* | 10/2016 | Ayabe | ............... | G06F 1/14 |
| 2016/0378417 A1* | 12/2016 | Kenjalkar | ............ | G06F 3/1423 |
| | | | | 345/2.2 |
| 2017/0083148 A1* | 3/2017 | Ahn | ............... | H04M 1/7253 |
| 2017/0118271 A1* | 4/2017 | Reyes | ............... | H04L 67/06 |
| 2017/0257403 A1* | 9/2017 | Li | ............... | G06F 3/1454 |
| 2017/0366937 A1* | 12/2017 | Lee | ............... | H04W 4/023 |
| 2018/0070122 A1* | 3/2018 | Baek | ............... | G09G 5/003 |

OTHER PUBLICATIONS

Bhanourawala et al; Screen sharing application for mobile phones; 2015; IEEE; 4 pages.*

* cited by examiner

SCREEN SHARING SYSTEM AND METHOD FOR SHARING SCREEN

CROSS REFERENCE TO RELATED APPLICATIONS

This application claims priority to Japanese Patent Application No. 2015-203580 filed on Oct. 15, 2015, the entire contents of which are incorporated by reference herein.

TECHNICAL FIELD

The present invention relates to a screen sharing system and a method for sharing a screen with a destination terminal.

BACKGROUND ART

Recently, a public line network such as the Internet has allowed a plurality of terminals to share a screen, so that an operator terminal displays the screen of the destination terminal. In such a screen sharing, the operator terminal receives screen data from the destination terminal and displays the received screen data in the shared screen display area set in itself.

In such a screen sharing, in the same way as Patent Document 1, display information is generated in accordance with an operation instruction input by a user. This display information is separated into display information in a display area of the operator terminal itself and display information in the display area of another screen sharing system by applying coordinate transformation. Then, a screen is displayed on the operator terminal itself based on the display information in a display area of the operator terminal itself, and a screen is displayed on another screen sharing system based on the display information in another screen sharing system.

CITATION LIST

Patent Literature

Patent Document 1: JP H 11-327523 A

SUMMARY OF INVENTION

In the constitution of Patent Document 1, even if display information in a display area of the operator terminal itself is different from that in another screen sharing system, screen data corresponding to each display area can be displayed.

However, in the constitution of Patent Document 1, screen data in only a part of area displayed in the display area are hardly changed because screen data are displayed as one image data. For example, it is difficult to change the resolution of a part of area, to zoom, rotate, and scroll a part of area, change a displayed moving image to a still image, and to change a displayed still image to a moving image.

Therefore, an objective of the present invention is to provide a screen sharing system and a method for sharing a screen which improve the convenience by changing screen data in a part of the display area of the shared screen in screen sharing.

According to the first aspect of the present invention, a screen sharing system for sharing a screen with a destination terminal includes:

a specified-area receiving unit that receives a specified area of a predetermined area in a shared area where a screen is shared with the destination terminal;

a transmission unit that transmits request data to request a change of the received specified area to the destination terminal;

a response data receiving unit that receives response data responding to the request from the destination terminal; and a display unit that changes and displays the specified area based on the received response data.

According to the first aspect of the present invention, a screen sharing system for sharing a screen with a destination terminal receives a specified area of a predetermined area in a shared area where a screen is shared with the destination terminal; transmits request data to request a change of the received specified area to the destination terminal; receives response data responding to the request from the destination terminal; and changes and displays the specified area based on the received response data.

The first aspect of the present invention is the category of a screen sharing system, but the other categories of a method for sharing a screen have similar functions and effects.

According to the second aspect of the present invention, a screen sharing system for sharing a screen with a destination terminal includes:

an operation receiving unit that receives an operation in a shared area where a screen is shared with the destination terminal;

a transmission unit that transmits request data to request a change of an area corresponding to the received operation to the destination terminal;

a response data receiving unit that receives response data responding to the request from the destination terminal; and a display unit that changes and displays the area corresponding to the received operation based on the received response data.

According to the second aspect of the present invention, a screen sharing system, the system sharing a screen with a destination terminal; receives an operation in a shared area where a screen is shared with the destination terminal; transmits request data to request a change of an area corresponding to the received operation to the destination terminal; receives response data responding to the request from the destination terminal; and changes and displays the area corresponding to the received operation based on the received response data.

The second aspect of the present invention is the category of a screen sharing system, but the other categories of a method for sharing a screen have similar functions and effects.

According to the third aspect of the present invention, a screen sharing system for sharing a screen with a destination terminal includes:

a detection unit that detects an area moving in a shared area where a screen is shared with the destination terminal;

a transmission unit that transmits request data to request a change of the detected area to the destination terminal;

a response data receiving unit that receives response data responding to the request from the destination terminal; and a display unit that changes and displays the detected area based on the received response data.

According to the third aspect of the present invention, a screen sharing system for sharing a screen with a destination terminal detects an area moving in a shared area where a screen is shared with the destination terminal; transmits request data to request a change of the detected area to the destination terminal; receives response data responding to the request from the destination terminal; and changes and displays the detected area based on the received response data.

The third aspect of the present invention is the category of a screen sharing system, but the other categories of a method for sharing a screen have similar functions and effects.

According to the fourth aspect of the present invention, in the system according to any one of the first to the third aspects of the present invention, the display unit changes resolution.

According to the fourth aspect of the present invention, the system according to any one of the first to the third aspects of the present invention changes resolution.

According to the fifth aspect of the present invention, in the system according to any one of the first to the third aspects of the present invention, the display unit changes FPS.

According to the fifth aspect of the present invention, the system according to any one of the first to the third aspects of the present invention changes FPS.

According to the sixth aspect of the present invention, in the system according to any one of the first to the third aspects of the present invention, the display unit changes a moving image to a still image.

According to the sixth aspect of the present invention, the system according to any one of the first to the third aspects of the present invention changes a moving image to a still image.

According to the seventh aspect of the present invention, in the system according to the first or the second aspect, the display unit changes a still image to a moving image.

According to the seventh aspect of the present invention, the system according to the first or the second aspect changes a still image to a moving image.

According to the eighth aspect of the present invention, in the system according to any one of the first to the third aspects of the present invention, the display unit superimposed-displays the shared area.

According to the eighth aspect of the present invention, the system according to any one of the first to the third aspects of the present invention superimposed-displays the shared area.

According to the ninth aspect of the present invention, in the system according to any one of the first to the third aspects of the present invention, the display unit displays outside of the shared area.

According to the ninth aspect of the present invention, the system according to any one of the first to the third aspects of the present invention displays outside of the shared area.

According to the tenth aspect of the present invention, a method for sharing a screen with a destination terminal includes the steps of:

receiving a specified area of a predetermined area in a shared area where a screen is shared with the destination terminal;

transmitting request data to request a change of the received specified area to the destination terminal;

receiving response data responding to the request from the destination terminal; and changing and displaying the specified area based on the received response data.

According to the eleventh aspect of the present invention, a method for sharing a screen with a destination terminal includes the steps of:

receiving an operation in a shared area where a screen is shared with the destination terminal;

transmitting request data to request a change of an area corresponding to the received operation to the destination terminal;

receiving response data responding to the request from the destination terminal; and changing and displaying the area corresponding to the received operation based on the received response data.

According to the twelfth aspect of the present invention, a method for sharing a screen with a destination terminal includes the steps of:

detecting an area moving in a shared area where a screen is shared with the destination terminal;

transmitting request data to request a change of the detected area to the destination terminal;

receiving response data responding to the request from the destination terminal; and changing and displaying the detected area based on the received response data.

The present invention can provide a screen sharing system and a method for sharing a screen which improve the convenience by changing screen data in a part of the display area of the shared screen in screen sharing.

DESCRIPTION OF EMBODIMENTS

Embodiments of the present invention will be described below with reference to the attached drawings. However, these are illustrative only, and the scope of the present invention is not limited thereto.

Overview of System for Sharing Screen 1

Figure 1:
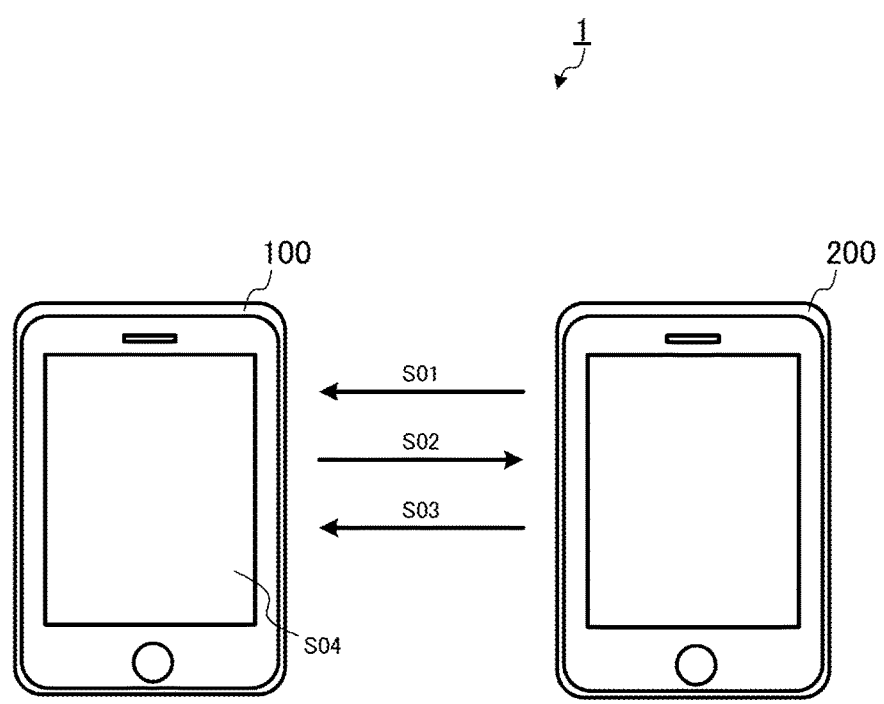
FIG. 1 is the schematic diagram showing the screen sharing system 1.

The overview of the present invention will be described below with reference to FIG. 1. The screen sharing system 1 includes an operator terminal 100 and a destination terminal 200. In these embodiments, the system including an operator terminal 100 and a destination terminal 200 will be explained. However, this does not necessarily mean that the system includes a plurality of terminals that have functions different from each other. The system may be a plurality of terminals that have the same functions as each other. The operator terminal 100 may be connected with the destination terminal 200 through a server device.

First, communication is established between the operator terminal 100 and the destination terminal 200 to share a screen (step S01). The operator terminal 100 receives screen data of the destination terminal 200 and displays the received screen data in the shared area. For example, in the step S01, during a call such as a video-phone call or while a special application is running, the operator terminal 100 transmits a transmission request of screen data showing a screen content to the destination terminal 200, and then the destination terminal 200 receives this transmission request and starts to transmit screen data to the operator terminal 100 based on this transmission request.

If detecting a predetermined input or operation in the shared area, the operator terminal 100 transmits request data to request a change of the area corresponding to the received input or the detected movement to the destination terminal 200 (step S02). In the step S02, the predetermined input is to specify a predetermined area in the shared area and to receive an operation in the shared area. In the step S02, examples of the operation in the shared area include zoom-in, zoom-out, rotating, and scrolling operations. In the step S02, the detection of a predetermined movement is to detect an area moving in the shared area. Examples of the change of an area include changing the resolution and the display magnification; rotating and scrolling the screen; and changing a moving image to a still image and a still image to a moving image.

The destination terminal 200 receives the request data and transmits the response data responding to the request (step S03). Examples of the response data include screen data in which resolution and display magnification are changed; screen data in rotated and scrolled screen data; and screen data in which a moving image is changed to a still image and in which a still image is changed to a moving image.

In the step S03, the destination terminal 200 transmits response data through a communication channel different from that transmitting screen data in the step S01. For example, the communication channel at this time transmits response data to the operator terminal 100 as a packet different from that of the screen data transmitted in the step S01.

The operator terminal 100 receives the response data and changes and displays the area corresponding to the received predetermined input or the detected predetermined movement based on the response data (step S04). In the step S04, the operator terminal 100 may superimposed-display screen data changed based on the response data in the shared screen displayed inside or outside the shared area. In step S04, examples of the screen data changed based on the response data that the operator terminal 100 displays include screen data in which resolution and display magnification are changed to higher or lower; rotated and scrolled screen data; and screen data in which a moving image is changed to a still image and in which a still image is changed to a moving image.

According to the above-mentioned system configuration, the screen sharing system 1 can devote the communication band to an important part to dynamically transmit the compression ratio and the resolution of the image that used to be transmitted at a uniform rate per image, at a high resolution compared with other areas. Furthermore, during a call such as a video-phone call or while a special application is running, the screen sharing system 1 can transmits only a specified area, a zoomed-in area at a high resolution; not a moving image but a high-resolution still image that is automatically taken, when a moving image is zoomed-in; and a high-resolution moving image in which still images are continuously taken.

Figure 2:
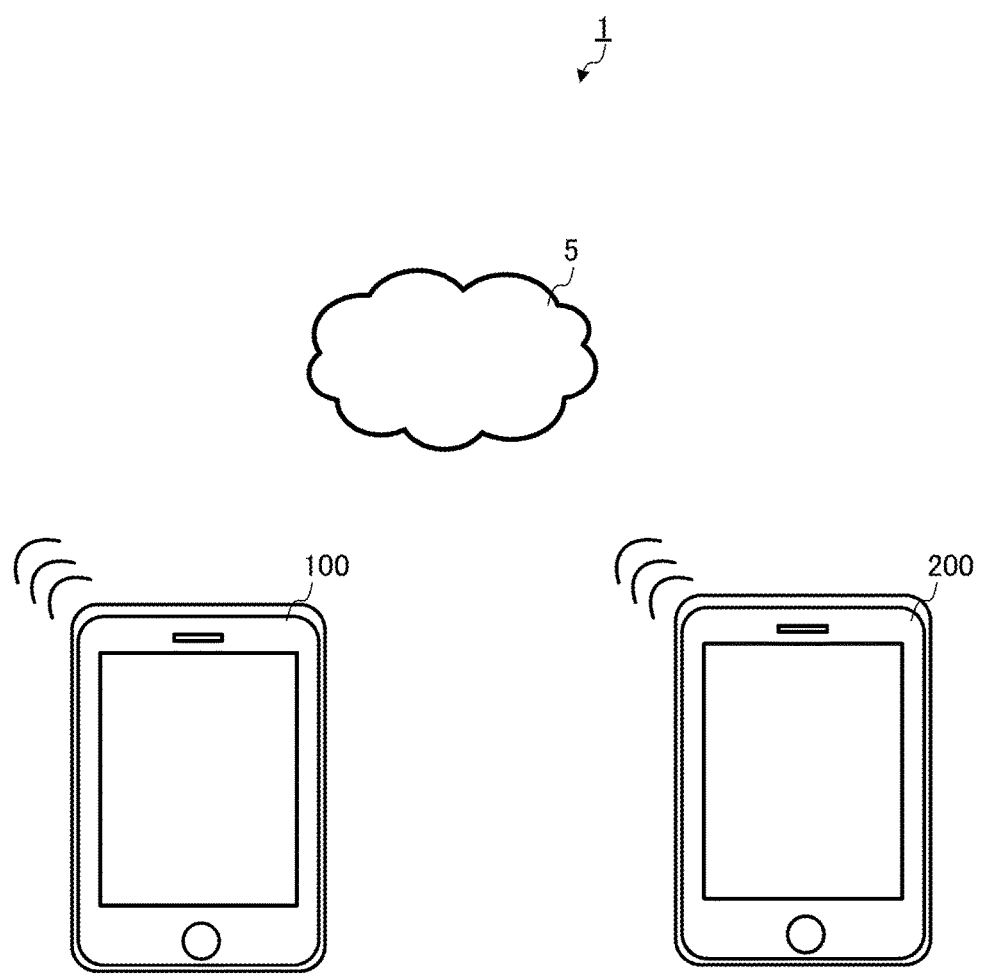
FIG. 2 is the overall schematic diagram of a screen sharing system 1.

FIG. 2 is a block diagram illustrating a screen sharing system 1 according to embodiments of the present invention. The screen sharing system 1 includes an operator terminal 100, a destination terminal 200, and a public line network 5 (e.g. the Internet network, a third and a fourth generation networks). In these embodiments, the screen sharing system 1 including an operator terminal 100 and a destination terminal 200 will be explained. However, this does not necessarily mean that the screen sharing system 1 includes a plurality of terminals that have functions different from each other. The screen sharing system 1 may be a plurality of terminals that have the same functions as each other. The operator terminal 100 may be communicatively connected with the destination terminal 200 through a server device.

The operator terminal 100 may be communicatively connected with the destination terminal 200 through a public line network 5. The operator terminal 100 may be communicatively connected with the destination terminal 200 through a server, through a network device including a router, or through short-range wireless communication such as infrared communication or Bluetooth®.

The operator terminal 100 may be an information terminal executing various applications, which is an information device or an electrical appliance with functions to be described later. For example, the operator terminal 100 may be a mobile phone, a smart phone, a complex printer, a television, a network device such as a router or a gateway, and a computer. The operator terminal 100 may also be a white good such as a refrigerator or a washing machine. The operator terminal 100 may also be an information appliance such as a telephone, a netbook terminal, a slate terminal, an electronic book terminal, an electronic dictionary terminal, a portable music player, and a portable content player and recorder.

In the same way as the operator terminal 100, the destination terminal 200 may be an information terminal executing various applications, which is an information device or an electrical appliance with functions to be described later. For example, the destination terminal 200 may be a mobile phone, a smart phone, a complex printer, a television, a network device such as a router or a gateway, and a computer. The destination terminal 200 may also be a white good such as a refrigerator or a washing machine. The destination terminal 200 may also be an information appliance such as a telephone, a netbook terminal, a slate terminal, an electronic book terminal, an electronic dictionary terminal, a portable music player, and a portable content player and recorder.

Functions

Figure 3:
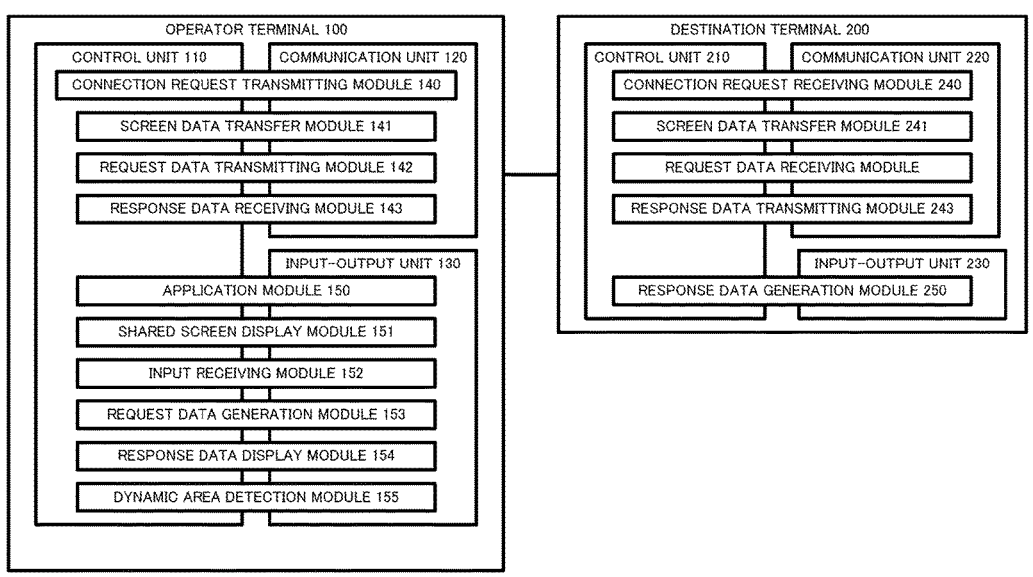
FIG. 3 is a functional block diagram of the operator terminal 100 and the destination terminal 200.

FIG. 3 is a functional block diagram of the operator terminal 100 and the destination terminal 200 to show the relationship among the functions.

The operator terminal 100 includes a control unit 110 including a central processing unit (hereinafter referred to as "CPU"), a random access memory (hereinafter referred to as "RAM"), and a read only memory (hereinafter referred to as "ROM"); and a communication unit 120 including a Wireless Fidelity or Wi-Fi® enabled device complying with, for example, IEEE 802.11, or a wireless device complying with the IMT-2000 standard such as the third generation mobile communication system. The communication unit 120 may include a wired device for LAN connection.

The operator terminal 100 also includes an input-output unit 130 including a display unit outputting and displaying data and images that have been processed by the control unit 110; and also including a touch panel, a keyboard, and a mouse that receive an input from a user.

In the operator terminal 100, the control unit 110 reads a predetermined program to run a connection request transmitting module 140, a screen data transfer module 141, a request data transmitting module 142, and a response data receiving module 143 in cooperation with the communication unit 120. Furthermore, in the operator terminal 100, the control unit 110 reads a predetermined program to run an application module 150, a shared screen display module 151, an input receiving module 152, and a request data generation module 153, a response data display module 154, and a dynamic area detection module 155 in cooperation with the input-output unit 130.

In the same way as the operator terminal 100, the destination terminal 200 includes a control unit 210 including a CPU, a RAM, and a ROM; and a communication unit 220 including a Wireless Fidelity or Wi-Fi® enabled device complying with, for example, IEEE802.11, or a wireless device complying with the IMT-2000 standard such as the third generation mobile communication system. The communication unit 220 may include a wired device for LAN connection.

The destination terminal 200 also includes an input-output unit 230 including a display unit outputting and displaying data and images that have been processed by the control unit 210; and also including a touch panel, a keyboard, and a mouse that receive an input from a user.

In the destination terminal 200, the control unit 210 reads a predetermined program to run a connection request receiving module 240, a screen data transfer module 241, a request data receiving module 242, and a response data transmitting module 243 in cooperation with the communication unit 220. Furthermore, in the destination terminal 200, the control unit 210 reads a predetermined program to run a response data generation module 250 in cooperation with the input-output unit 230.

Screen Sharing Process in First Embodiment

Figure 4:
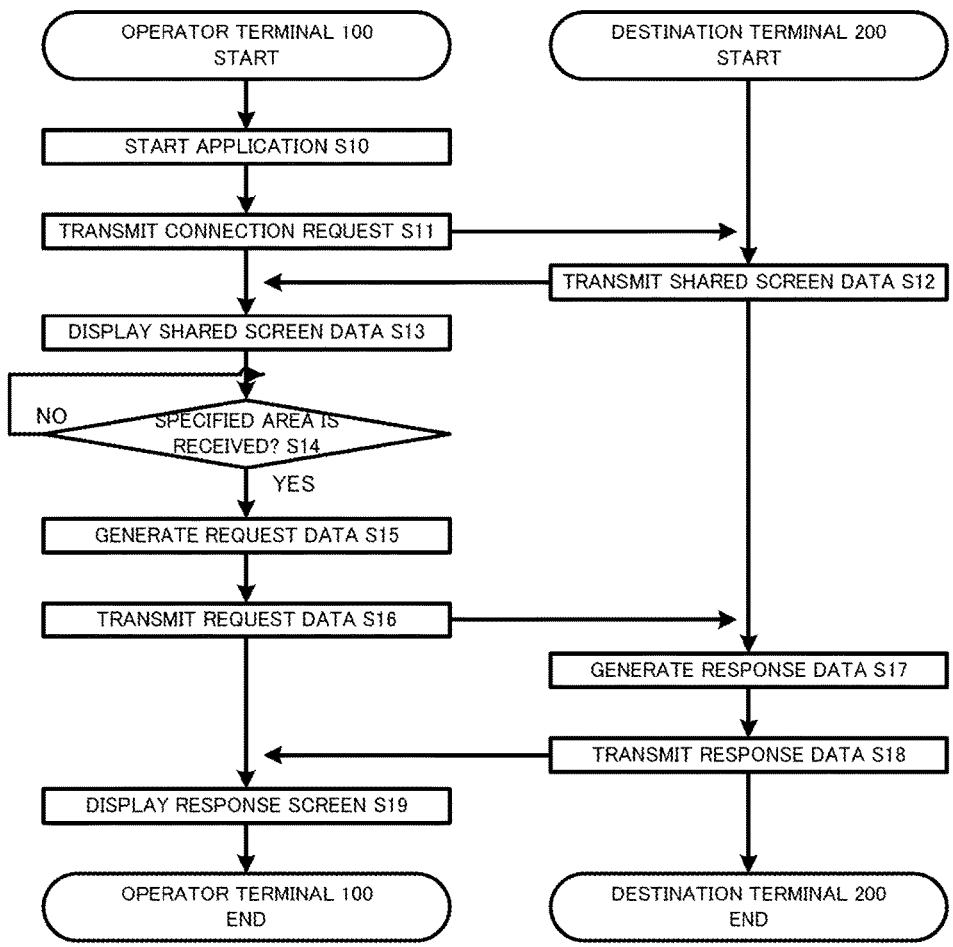
FIG. 4 is a flow chart of the screen sharing process executed by the operator terminal 100 and the destination terminal 200 in the first embodiment.

FIG. 4 is a flow chart of the screen sharing process executed by the operator terminal 100 and the destination terminal 200 in the first embodiment. The tasks executed by the modules of the above-mentioned devices are explained below together with this process. As described above, the operator terminal 100 and the destination terminal 200 may not have functions different from each other and may have the same functions as each other. The operator terminal 100 may have functions of the destination terminal 200 and vice versa.

First, the application module 150 of the operator terminal 100 starts an application involved in screen sharing (step S10). The connection request transmitting module 140 of the operator terminal 100 transmits a connection request to the destination terminal 200 to establish network connection necessary for screen sharing (step S11).

The connection request receiving module 240 of the destination terminal 200 receives the connection request transmitted from the operator terminal 100. The screen data transfer module 241 of the destination terminal 200 starts network connection with the operator terminal 100 based on the connection request and transmits a screen content displayed on the destination terminal 200 itself to the operator terminal 100 as shared screen data (step S12).

The screen data transfer module 141 of the operator terminal 100 receives the shared screen data transmitted from the destination terminal 200. The shared screen display module 151 of the operator terminal 100 displays the received shared screen data in a shared area 300 shown in FIG. 7 (step S13).

Figure 7:
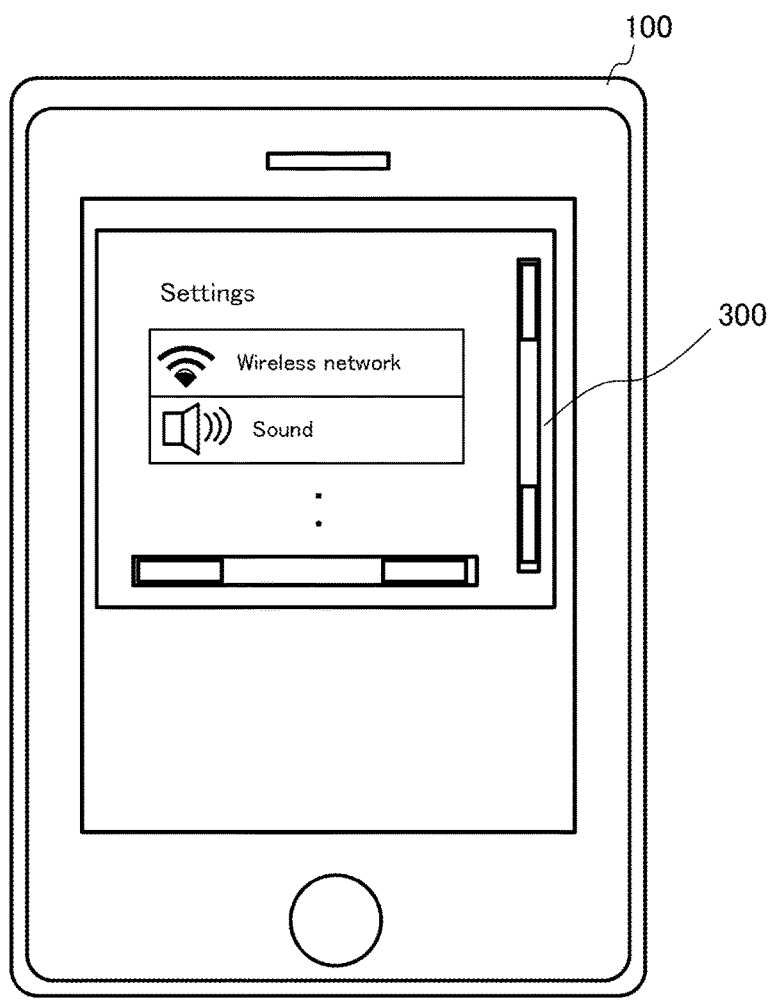
FIG. 7 shows a shared screen displayed on the operator terminal 100.

FIG. 7 shows a shared area 300 displayed by the shared screen display module 151 of the operator terminal 100. In FIG. 7, the shared screen display module 151 displays the shared screen data transmitted from the destination terminal 200 in the shared area 300. The input receiving module 152 of the operator terminal 100 receives a specified area of a predetermined area in the shared area 300.

Figure 8:
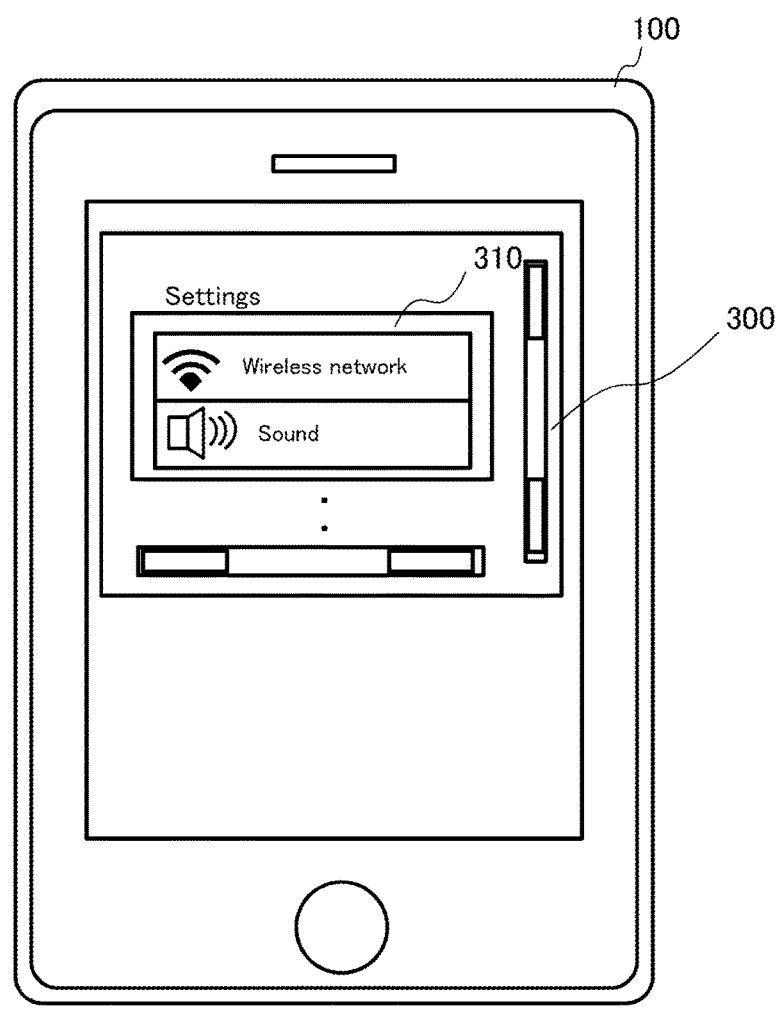
FIG. 8 shows a shared screen displayed on the operator terminal 100.

Then, the input receiving module 152 of the operator terminal 100 judges whether or not the input receiving module 152 receives a specified area of a predetermined area in the shared area 300. In the step S14, the input receiving module 152 judges whether or not the input receiving module 152 receives an input of a specifying line 310 shown in FIG. 8. The specifying line 310 is not limited to a rectangle and may be other shapes such as a circle, a dot, a straight line, and a curve. The specifying line 310 capable of specifying an area should be enough.

In the step S14, if judging that the input receiving module 152 does not receive an input of a specified area (NO), the input receiving module 152 of the operator terminal 100 repeats this step until receiving an input.

On the other hand, if the input receiving module 152 judges that the input receiving module 152 receives an input of a specified area (YES) in the step S14, the request data generation module 153 of the operator terminal 100 generates request data to request a change of the area corresponding to the received input (step S15). In this embodiment, the request data generation module 153 generates request data to change the resolution of shared screen data of the area corresponding to the received input to a higher resolution in the step S15.

The request data generation module 153 may generate request data to change the resolution of shared screen data to a lower resolution. The request data generation module 153 may also generate request data to request a change of frame per second (hereinafter referred to as "FPS"). The request data generation module 153 may also generate request data to zoom the specified area. In this case, the request data generation module 153 may generate request data to change the display magnification of the specified area to a predetermined display magnification (e.g., 0.3, 0.5, 1.0, 1.5, 2.0-fold magnification). The request data generation module 153 may also generate request data to rotate the specified area. In this case, the request data generation module 153 may generate request data to rotate the screen predetermined degrees (e.g., 45, 90, 180 degrees) at one point in the specified area or another area. The request data generation module 153 may generate request data to rotate the screen by another method. Furthermore, if the shared screen displayed in the shared area 300 is a moving image, the request data generation module 153 may generate request data to request a change of the moving image to a still image. Furthermore, if the shared screen displayed in the shared area 300 is a still image, the request data generation module 153 may generate request data to request a change of the still image to a moving image.

The request data transmitting module 142 of the operator terminal 100 transmits the above-mentioned request data to the destination terminal 200 (step S16).

The request data receiving module 242 of the destination terminal 200 receives the request data transmitted from the operator terminal 100. The response data generation module 250 of the destination terminal 200 generates response data responding to the received request data (step S17). In the step S17, the response data generation module 250 generates response data in which the resolution of screen data in the area specified by the operator terminal 100 is changed to a higher resolution. In other words, the response data generation module 250 generates response data as data different from the shared screen data transmitted from the destination terminal 200 itself.

If the request data receiving module 242 receives request data to change the resolution of shared screen data to a lower resolution, the response data generation module 250 may generate response data in which the resolution of shared screen data is changed to a lower resolution. Furthermore, if the request data receiving module 242 receives request data to request a change of FPS, the response data generation module 250 may generate response data in which FPS is changed. Furthermore, if the request data receiving module 242 receives request data to zoom the specified area, the response data generation module 250 may generate response data in which the display magnification of the specified area is changed to a predetermined display magnification (e.g., 0.3, 0.5, 1.0, 1.5, 2.0-fold magnification). Furthermore, if the request data receiving module 242 receives request data to rotate the specified area, the response data generation module 250 may generate response data in which the screen is rotated predetermined degrees (e.g., 45, 90, 180 degrees) at one point in the specified area or another area. The response data generation module 250 may also generate response data in which the screen is rotated by another method. Furthermore, if the shared data is a moving image, the response data generation module 250 may generate response data in which the moving image is changed to a still image. In this case, the response data generation module 250 may generate a still image taken from a moving image at intervals of a predetermined time. The response data generation module 250 may generate a still image by another method. Furthermore, if the shared data is a still image, the response data generation module 250 may generate response data in which the still image is changed to a moving image. In this case, the response data generation module 250 may connect still images at intervals of a predetermined time to generate a moving image. The response data generation module 250 may generate a moving image by another method.

The response data transmitting module 243 of the destination terminal 200 transmits the above-mentioned response data to the operator terminal 100 (step S18). In the step S18, the response data transmitting module 243 transmits response data to the operator terminal 100 by a communication channel different from that transmitting the above-mentioned screen data. Specifically, the shared screen data transmitted from the screen data transfer module 241 of the destination terminal 200 is handled as packet data different from the response data transmitted from the response data transmitting module 243 of the destination terminal 200. As a result, the destination terminal 200 transmits two kinds of packet data to the operator terminal 100.

Figure 9:
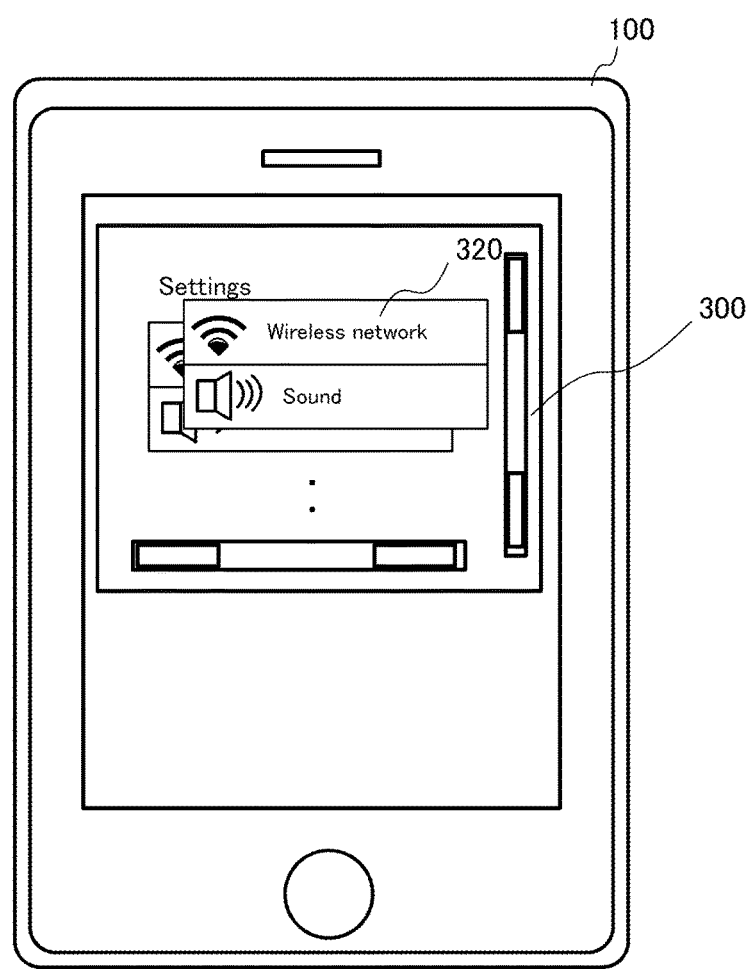
FIG. 9 shows a response screen 320 displayed on the operator terminal 100.

The screen data receiving module 143 of the operator terminal 100 receives the response data transmitted from the destination terminal 200. The response data display module 154 of the operator terminal 100 changes the specified area based on the received response data and displays the changed specified area as a response screen (step S19). In the step S19, the response data display module 154 superimposed-displays a response screen 320 in a shared area 300 as shown in FIG. 9. Alternatively, the response data display module 154 displays a response screen 320 outside of a shared area 300 as shown in FIG. 10.

FIG. 9 shows an example of the response screen displayed by the response data display module 154 of the operator terminal 100. The response data display module 154 superimposed-displays a response screen 320 in a shared area 300. At this time, the position of a response screen 320 displayed by the response data display module 154 is superimposed-displayed in an area specified by a specifying line 310. The position of a response screen 320 displayed by the response data display module 154 may be another position in a shared area 300. Furthermore, the response data display module 154 may not display a whole response screen 320 but a part of it. The operator terminal 100 may change the display range of a response screen in accordance with a displayable screen resolution as needed.

Figure 10:
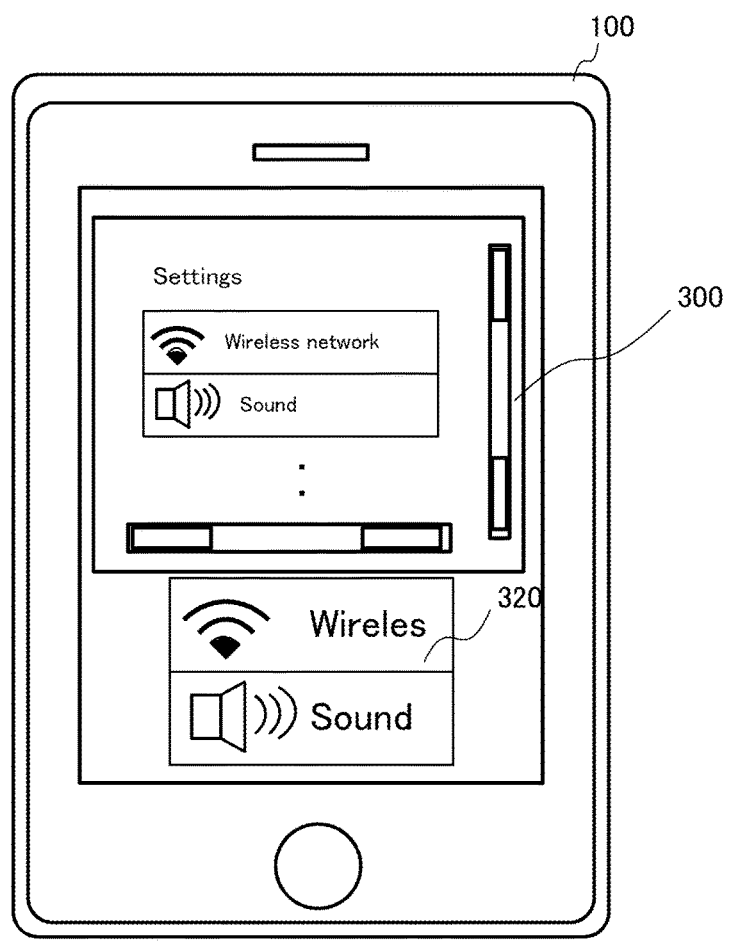
FIG. 10 shows a response screen 320 displayed on the operator terminal 100.

FIG. 10 shows an example of the response screen displayed by the response data display module 154 of the operator terminal 100. The response data display module 154 displays a response screen 320 outside a shared area 300. The position of a response screen 320 displayed by the response data display module 154 may be another position outside a shared area 300. Furthermore, the response data display module 154 may not display a whole response screen 320 but a part of it. The operator terminal 100 may change the display range of a response screen in accordance with a displayable screen resolution as needed.

If the resolution of screen data is changed to a lower resolution in the received response data, the response data display module 154 of the operator terminal 100 may superimposed-display response data in which the resolution of screen data is changed to a lower resolution, inside or outside a shared area 300 as a response screen 320. If FPS is changed in the received response data, the response data display module 154 of the operator terminal 100 may superimposed-display response data in which FPS is changed, inside or outside a shared area 300 as a response screen 320. If display magnification is changed in the received response data, the response data display module 154 of the operator terminal 100 may superimposed-display response data in which display magnification is changed, inside or outside a shared area 300 as a response screen 320. If screen data is rotated in the received response data, the response data display module 154 of the operator terminal 100 may superimposed-display response data in which screen data is rotated, inside or outside a shared area 300 as a response screen 320. If a moving image is changed to a still image in the received response data, the response data display module 154 of the operator terminal 100 may superimposed-display response data in which a moving image is changed to a still image, inside or outside a shared area 300 as a response screen 320. If a still image is changed to a moving image in the received response data, the response data display module 154 of the operator terminal 100 may superimposed-display response data in which a still image is changed to a moving image, inside or outside a shared area 300 as a response screen 320.

Screen Sharing Process in Second Embodiment

Figure 5:
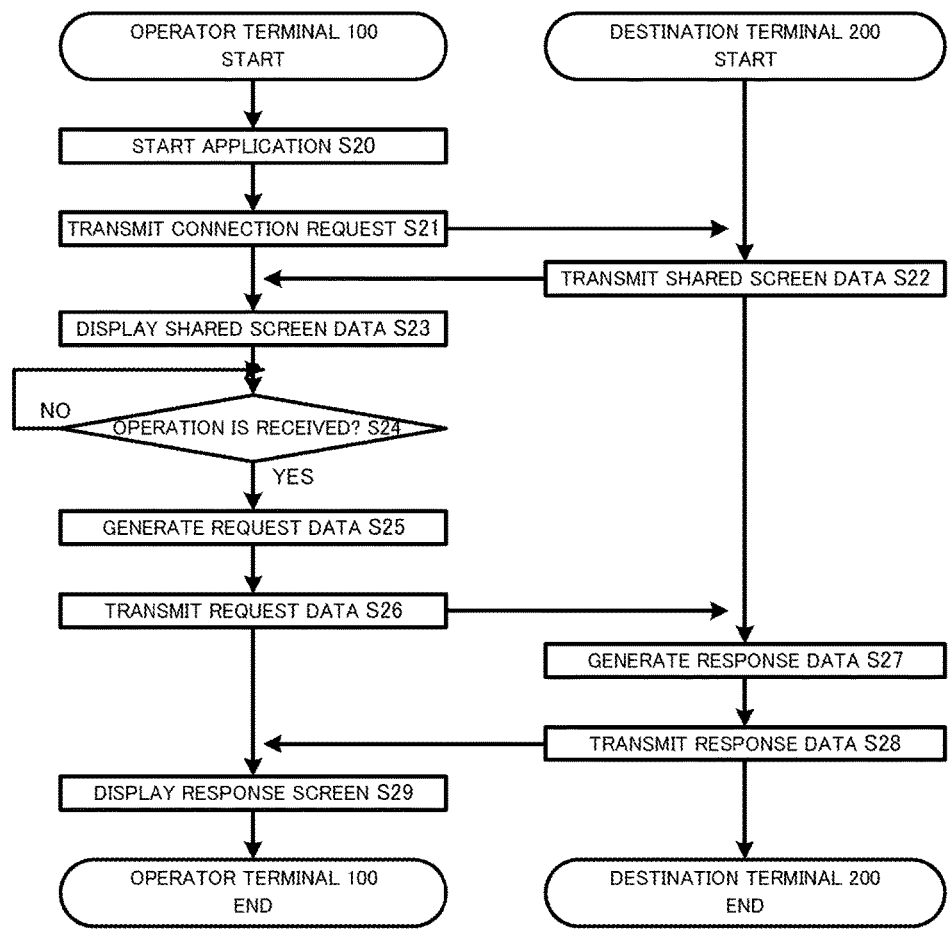
FIG. 5 is a flow chart of the screen sharing process executed by the operator terminal 100 and the destination terminal 200 in the second embodiment.

FIG. 5 is a flow chart of the screen sharing process executed by the operator terminal 100 and the destination terminal 200 in the second embodiment. The tasks executed by the modules of the above-mentioned devices are explained below together with this process. As described above, the operator terminal 100 and the destination terminal 200 may not have functions different from each other and may have the same functions as each other. The operator terminal 100 may have functions of the destination terminal 200 and vice versa.

First, the application module 150 of the operator terminal 100 starts an application involved in screen sharing (step S20). The connection request transmitting module 140 of the operator terminal 100 transmits a connection request to the destination terminal 200 to establish network connection necessary for screen sharing (step S21).

The connection request receiving module 240 of the destination terminal 200 receives the connection request transmitted from the operator terminal 100. The screen data transfer module 241 of the destination terminal 200 starts network connection with the operator terminal 100 based on the connection request and transmits a screen content displayed on the destination terminal 200 itself to the operator terminal 100 as shared screen data (step S22).

The screen data transfer module 141 of the operator terminal 100 receives the shared screen data transmitted from the destination terminal 200. The shared screen display module 151 of the operator terminal 100 displays the received shared screen data in a shared area 300 shown in FIG. 7 (step S23).

Then, the input receiving module 152 of the operator terminal 100 judges whether or not the input receiving module 152 receives an operation in the shared area 300. In the step S24, the input receiving module 152 judges whether or not the input receiving module 152 receives an input of operation to change the resolution or to change the display magnification to higher or lower; or rotation or scrolling operation. In the step S24, the input receiving module 152 may receive other operations.

In the step S24, if judging that the input receiving module 152 does not receive an operation (NO), the input receiving module 152 repeats this step until receiving an input.

On the other hand, if the input receiving module 152 judges that the input receiving module 152 receives an operation (YES) in the step S24, the request data generation module 153 of the operator terminal 100 generates request data to request a change of the area corresponding to the received operation (step S25). In this embodiment, the request data generation module 153 generates request data to change the resolution of shared screen data of the area corresponding to the received operation to a higher resolution in the step S25.

The request data generation module 153 may generate request data to change the resolution of the area corresponding to the received operation to a lower resolution. The request data generation module 153 may also generate request data to request a change of FPS of the area corresponding to the received operation. The request data generation module 153 may also generate request data to zoom the area corresponding to the received operation. In this case, the request data generation module 153 may generate request data to change the display magnification of the area corresponding to the received operation to a predetermined display magnification (e.g., 0.3, 0.5, 1.0, 1.5, 2.0-fold magnification). The request data generation module 153 may also generate request data to rotate the area corresponding to the received operation. In this case, the request data generation module 153 may generate request data to rotate the screen predetermined degrees (e.g., 45, 90, 180 degrees) at one point in the area corresponding to the received operation or another area. Alternatively, the request data generation module 153 may generate request data to rotate the screen by another method. The request data generation module 153 may also generate request data to scroll the area corresponding to the received operation. In this case, the request data generation module 153 may generate request data to scroll only the area corresponding to the received operation to a prescribed display position (e.g. further one page, three pages, one line, three lines). Furthermore, if the shared screen displayed in the shared area 300 is a moving image, the request data generation module 153 may generate request data to request a change of the moving image to a still image. Furthermore, if the shared screen displayed in the shared area 300 is a still image, the request data generation module 153 may generate request data to request a change of the still image to a moving image.

The request data transmitting module 142 of the operator terminal 100 transmits the above-mentioned request data to the destination terminal 200 (step S26).

The request data receiving module 242 of the destination terminal 200 receives the request data transmitted from the operator terminal 100. The response data generation module 250 of the destination terminal 200 generates response data responding to the received request data (step S27). In the step S27, the response data generation module 250 generates response data in which the resolution of screen data in the area corresponding to the operation received by the operator terminal 100 is changed to a higher resolution. In other words, the response data generation module 250 generates response data as data different from the shared screen data transmitted from the destination terminal 200 itself.

If the request data receiving module 242 receives request data to change the resolution of shared screen data to a lower resolution, the response data generation module 250 may generate response data in which the resolution of shared screen data is changed to a lower resolution. Furthermore, if the request data receiving module 242 receives request data to request a change of FPS, the response data generation module 250 may generate response data in which FPS is changed. Furthermore, if the request data receiving module 242 receives request data to zoom the area corresponding to the received operation, the response data generation module 250 may generate response data in which the display magnification of the area corresponding to the received operation is changed to a predetermined display magnification (e.g., 0.3, 0.5, 1.0, 1.5, 2.0-fold magnification). Furthermore, if the request data receiving module 242 receives request data to rotate the area corresponding to the received operation, the response data generation module 250 may generate response data in which the screen is rotated predetermined degrees (e.g., 45, 90, 180 degrees) at one point in the area corresponding to the received operation or another area. The response data generation module 250 may also generate response data in which the screen is rotated by another method. If the request data receiving module 242 receives request data to scroll the area corresponding to the received operation, the response data generation module 250 may also generate response data in which the area corresponding to the received operation is scrolled. In this case, the response data generation module 250 may generate response data in which only the area corresponding to the received operation is scrolled to a prescribed display position (e.g. further one page, three pages, one line, three lines). Furthermore, if the shared data is a moving image, the response data generation module 250 may generate response data in which the moving image is changed to a still image. In this case, the response data generation module 250 may generate a still image taken from a moving image at intervals of a predetermined time. The response data generation module 250 may generate a still image by another method. Furthermore, if the shared data is a still image, the response data generation module 250 may generate response data in which the still image is changed to a moving image. In this case, the response data generation module 250 may connect still images at intervals of a predetermined time to generate a moving image. The response data generation module 250 may generate a moving image by another method.

The response data transmitting module 243 of the destination terminal 200 transmits the above-mentioned response data to the operator terminal 100 (step S28). In the step S28, the response data transmitting module 243 transmits response data to the operator terminal 100 by a communication channel different from that transmitting the above-mentioned screen data. Specifically, the shared screen data transmitted from the screen data transfer module 241 of the destination terminal 200 is handled as packet data different from the response data transmitted from the response data transmitting module 243 of the destination terminal 200. As a result, the destination terminal 200 transmits two kinds of packet data to the operator terminal 100.

The screen data receiving module 143 of the operator terminal 100 receives the response data transmitted from the destination terminal 200. The response data display module 154 of the operator terminal 100 changes the specified area based on the received response data and displays the changed specified area as a response screen (step S29). In the step S29, the response data display module 154 superimposed-displays a response screen 320 in a shared area 300 as shown in FIG. 9 in the same way as the first embodiment. Alternatively, the response data display module 154 displays a response screen 320 outside a shared area 300 as shown in FIG. 10 in the same way as the first embodiment.

If the resolution of screen data is changed to a lower resolution in the received response data, the response data display module 154 of the operator terminal 100 may superimposed-display response data in which the resolution of screen data is changed to a lower resolution, inside or outside a shared area 300 as a response screen 320. If FPS is changed in the received response data, the response data display module 154 of the operator terminal 100 may superimposed-display response data in which FPS is changed, inside or outside a shared area 300 as a response screen 320. If display magnification is changed in the received response data, the response data display module 154 of the operator terminal 100 may superimposed-display response data in which display magnification is changed, inside or outside a shared area 300 as a response screen 320. If screen data is rotated in the received response data, the response data display module 154 of the operator terminal 100 may superimposed-display response data in which screen data is rotated, inside or outside a shared area 300 as a response screen 320. If screen data is scrolled in the received response data, the response data display module 154 of the operator terminal 100 may superimposed-display response data in which screen data is scrolled, inside or outside a shared area 300 as a response screen 320. If a moving image is changed to a still image in the received response data, the response data display module 154 of the operator terminal 100 may superimposed-display response data in which a moving image is changed to a still image, inside or outside a shared area 300 as a response screen 320. If a still image is changed to a moving image in the received response data, the response data display module 154 of the operator terminal 100 may superimposed-display response data in which a still image is changed to a moving image, inside or outside a shared area 300 as a response screen 320.

Screen Sharing Process in Third Embodiment

Figure 6:
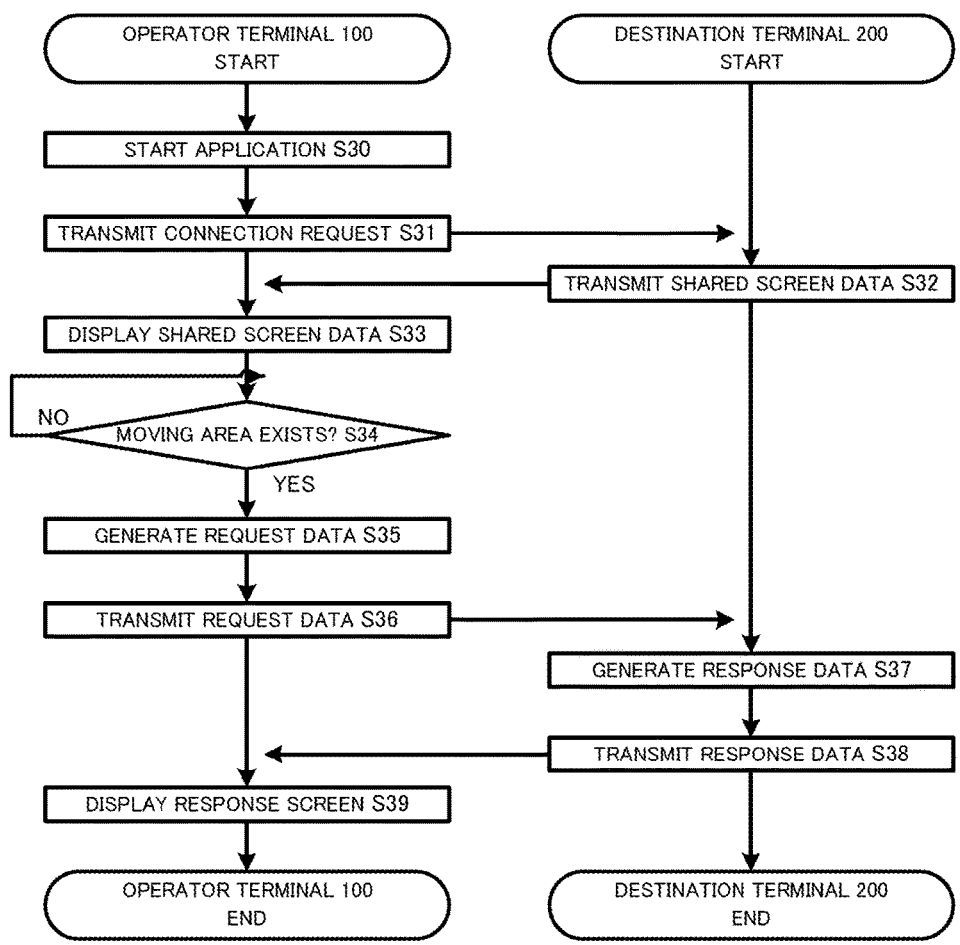
FIG. 6 is a flow chart of the screen sharing process executed by the operator terminal 100 and the destination terminal 200 in the third embodiment.

FIG. 6 is a flow chart of the screen sharing process executed by the operator terminal 100 and the destination terminal 200 in the third embodiment. The tasks executed by the modules of the above-mentioned devices are explained below together with this process. As described above, the operator terminal 100 and the destination terminal 200 may not have functions different from each other and may have the same functions as each other. The operator terminal 100 may have functions of the destination terminal 200 and vice versa.

First, the application module 150 of the operator terminal 100 starts an application involved in screen sharing (step S30). The connection request transmitting module 140 of the operator terminal 100 transmits a connection request to the destination terminal 200 to establish network connection necessary for screen sharing (step S31).

The connection request receiving module 240 of the destination terminal 200 receives the connection request transmitted from the operator terminal 100. The screen data transfer module 241 of the destination terminal 200 starts network connection with the operator terminal 100 based on the connection request and transmits a screen content displayed on the destination terminal 200 itself to the operator terminal 100 as shared screen data (step S32).

The screen data transfer module 141 of the operator terminal 100 receives the shared screen data transmitted from the destination terminal 200. The shared screen display module 151 of the operator terminal 100 displays the received shared screen data in a shared area 300 shown in FIG. 7 (step S33). This embodiment will be explained below assuming that the shared screen data is a moving image.

Then, the dynamic area detection module 155 of the operator terminal 100 judges whether or not there is an area moving in the shared area 300 (S34). In step S34, the dynamic area detection module 155 judges whether or not there is an area with a different FPS in the shared area 300. Specifically, in the step S34, if a moving image is displayed in the shared area 300, the dynamic area detection module 155 judges whether or not there is an area moving quickly.

In the step S34, if judging that there is no moving area (NO), the dynamic area detection module 155 repeats this step.

On the other hand, if the dynamic area detection module 155 of the operator terminal 100 judges that there is an moving area (YES) in the step S34, the request data generation module 153 of the operator terminal 100 generates request data to request a change of the detected area (step S35). In this embodiment, the request data generation module 153 generates request data to increase FPS of the detected area in the step S35.

The request data generation module 153 may generate request data to change the resolution of the detected area. In this case, the request data generation module 153 may generate request data to change the resolution of the detected area to a higher or a lower resolution. The request data generation module 153 may also generate request data to decrease FPS of the detected area. The request data generation module 153 may also generate request data to zoom the detected area. In this case, the request data generation module 153 may generate request data to change the display magnification of the detected area to a predetermined display magnification (e.g., 0.3, 0.5, 1.0, 1.5, 2.0-fold magnification). The request data generation module 153 may also generate request data to rotate the detected area. In this case, the request data generation module 153 may generate request data to rotate the screen predetermined degrees (e.g., 45, 90, 180 degrees) at one point in the detected area or another area. Alternatively, the request data generation module 153 may generate request data to rotate the screen by another method. The request data generation module 153 may also generate request data to scroll the detected area. In this case, the request data generation module 153 may generate request data to scroll only the area corresponding to the received operation to a prescribed display position (e.g. further one page, three pages, one line, three lines). Furthermore, if the shared screen displayed in the shared area 300 is a still image, the request data generation module 153 may also generate request data to request a change of a moving image to a still image.

The request data transmitting module 142 of the operator terminal 100 transmits the above-mentioned request data to the destination terminal 200 (step S36).

The request data receiving module 242 of the destination terminal 200 receives the request data transmitted from the operator terminal 100. The response data generation module 250 of the destination terminal 200 generates response data responding to the received request data (step S37). In the step S37, the response data generation module 250 generates response data in which FPS of screen data in the area detected by the operator terminal 100 is increased. In other words, the response data generation module 250 generates response data as data different from the shared screen data transmitted from the destination terminal 200 itself.

If the request data receiving module 242 receives request data to change the resolution of shared screen data to a higher resolution, the response data generation module 250 may generate response data in which the resolution of shared screen data is changed to a higher resolution. If the request data receiving module 242 receives request data to change the resolution of shared screen data to a lower resolution, the response data generation module 250 may generate response data in which the resolution of shared screen data is changed to a lower resolution. Furthermore, if the request data receiving module 242 receives request data to decrease FPS, the response data generation module 250 may generate response data in which FPS is decreased. Furthermore, if the request data receiving module 242 receives request data to zoom the detected area, the response data generation module 250 may generate response data in which the display magnification of the area corresponding to the received operation is changed to a predetermined display magnification (e.g., 0.3, 0.5, 1.0, 1.5, 2.0-fold magnification). In this case, the response data generation module 250 may generate not a moving image but high-resolution still image data that is automatically taken as response data. Furthermore, if the request data receiving module 242 receives request data to rotate the detected area, the response data generation module 250 may generate response data in which the screen is rotated predetermined degrees (e.g., 45, 90, 180 degrees) at one point in the detected area or another area. The response data generation module 250 may also generate response data in which the screen is rotated by another method. Furthermore, if the request data receiving module 242 receives request data to scroll the detected area, the response data generation module 250 may also generate response data in which the detected area is scrolled. In this case, the response data generation module 250 may generate response data in which only the area corresponding to the received operation is scrolled to a prescribed display position (e.g. further one page, three pages, one line, three lines). Furthermore, if the request data receiving module 242 receives request data to change the detected area from a moving image to a still image, the response data generation module 250 may generate response data in which a moving image is changed to a still image. In this case, the response data generation module 250 may generate a still image taken from a moving image at intervals of a predetermined time. The response data generation module 250 may generate a still image by another method.

The response data transmitting module 243 of the destination terminal 200 transmits the above-mentioned response data to the operator terminal 100 (step S38). In the step S38, the response data transmitting module 243 transmits response data to the operator terminal 100 by a communication channel different from that transmitting the above-mentioned screen data. Specifically, the shared screen data transmitted from the screen data transfer module 241 of the destination terminal 200 is handled as packet data different from the response data transmitted from the response data transmitting module 243 of the destination terminal 200. As a result, the destination terminal 200 transmits two kinds of packet data to the operator terminal 100.

The screen data receiving module 143 of the operator terminal 100 receives the response data transmitted from the destination terminal 200. The response data display module 154 of the operator terminal 100 changes the specified area based on the received response data and displays the changed specified area as a response screen (step S39). In the step S39, the response data display module 154 superimposed-displays a response screen 320 in a shared area 300 as shown in FIG. 9 in the same way as the first and the second embodiments. Alternatively, the response data display module 154 displays a response screen 320 outside a shared area 300 as shown in FIG. 10 in the same way as the first and the second embodiments.

According to the above-mentioned system configuration, in the third embodiment, if displaying a moving image with a different FPS, for example, if there is a part where a moving image that is moving quickly, the operator terminal 100 can increase FPS of the part that is moving quickly.

If the resolution of screen data is changed to a higher resolution in the received response data, the response data display module 154 of the operator terminal 100 may superimposed-display response data in which the resolution of screen data is changed to a higher resolution, inside or outside a shared area 300 as a response screen 320. If the resolution is changed to a lower resolution in the received response data, the response data display module 154 of the operator terminal 100 may superimposed-display response data in which the resolution of screen data is changed to a lower resolution, inside or outside a shared area 300 as a response screen 320. If FPS is decreased in the received response data, the response data display module 154 of the operator terminal 100 may superimposed-display response data in which FPS is decreased, inside or outside a shared area 300 as a response screen 320. If display magnification is changed in the received response data, the response data display module 154 of the operator terminal 100 may superimposed-display response data in which display magnification is changed, inside or outside a shared area 300 as a response screen 320. If screen data is rotated in the received response data, the response data display module 154 of the operator terminal 100 may superimposed-display response data in which screen data is rotated, inside or outside a shared area 300 as a response screen 320. If screen data is scrolled in the received response data, the response data display module 154 of the operator terminal 100 may superimposed-display response data in which screen data is scrolled, inside or outside a shared area 300 as a response screen 320. If a moving image is changed to a still image in the received response data, the response data display module 154 of the operator terminal 100 may superimposed-display response data in which a moving image is changed to a still image, inside or outside a shared area 300 as a response screen 320.

To achieve the means and the functions that are described above, a computer (including CPU, an information processor, and various terminals) reads and executes a predetermined program. For example, a program is provided in forms recorded in a computer-readable record medium such as a flexible disk, a CD (e.g., CD-ROM), or a DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to that described in the embodiments of the present invention.

REFERENCE SIGNS LIST

1 Screen sharing system
5 Public line network
100 Operator terminal
200 Destination terminal

What is claimed is:

1. A screen sharing system for sharing a screen with a destination terminal by an operator terminal, comprising:
a communication device;
a display device; and
a processor that
receives a specified area of a predetermined area in a shared area where a screen is shared with the destination terminal;
transmits, via the communication device, request data to request a change of a display format of screen data displayed in the received specified area to the destination terminal;
receives, via the communication device, response data responding to the request from the destination terminal through a first communication channel being different from a second communication channel through which the screen data to be shared are transmitted, the response data being data in which the display format of the screen data is changed;
changes the display format of the screen data displayed in the specified area based on the received response data to generate a response screen; and
displays, on the display device, the response screen together with the screen data of the specified area.

2. The system according to claim 1, wherein the processor changes the display format by changing resolution.

3. The system according to claim 1, wherein the processor changes the display format by changing frame per second (FPS).

4. The system according to claim 1, wherein the processor changes the display format by changing a moving image to a still image.

5. The system according to claim 1, wherein the processor changes the display format by changing a still image to a moving image.

6. The system according to claim 1, wherein the display device superimposed-displays the shared area.

7. The system according to claim 1, wherein the display device displays outside of the shared area.

8. A screen sharing system for sharing a screen with a destination terminal by an operator terminal, comprising:
a communication device;
a display device; and
a processor that
receives an operation in a shared area where a screen is shared with the destination terminal;
transmits, via the communication device, request data to request a change of a display format of screen data displayed in an area corresponding to the received operation to the destination terminal;
receives, via the communication device, response data responding to the request from the destination terminal through a first communication channel being different from a second communication channel through which the screen data to be shared are transmitted, the response data being data in which the display format of the screen data is changed;
changes the display format of the screen data displayed in the area corresponding to the received operation based on the received response data to generate a response screen; and
displays, on the display device, the response screen together with the screen data of the area corresponding to the received operation.

9. The system according to claim 8, wherein the processor changes the display format by changing resolution.

10. The system according to claim 8, wherein the processor changes the display format by changing frame per second (FPS).

11. The system according to claim 8, wherein the processor changes the display format by changing a moving image to a still image.

12. The system according to claim 8, wherein the processor changes the display format by changing a still image to a moving image.

13. The system according to claim 8, wherein the display device superimposed-displays the shared area.

14. The system according to claim 8, wherein the display device displays outside of the shared area.

15. A screen sharing system for sharing a screen with a destination terminal by an operator terminal, comprising:
a communication device;
a display device; and
a processor that
detects an area moving in a shared area where a screen is shared with the destination terminal;
transmits, via the communication device, request data to request a change of a display format of screen data displayed in the detected area to the destination terminal;
receives, via the communication device, response data responding to the request from the destination terminal through a first communication channel being different from a second communication channel through which the screen data to be shared are transmitted, the response data being data in which the display format of the screen data is changed;
changes the display format of the screen data displayed in the detected area based on the received response data to generate a response screen; and
displays, on the display device, the response screen together with the screen data of the detected area.

16. The system according to claim 15, wherein the processor changes the display format by changing resolution.

17. The system according to claim 15, wherein the processor changes the display format by changing frame per second (FPS).

18. The system according to claim 15, wherein the processor changes the display format by changing a moving image to a still image.

19. The system according to claim 15, wherein the display device superimposed-displays the shared area.

20. The system according to claim 15, wherein the display device displays outside of the shared area.

21. A method for sharing a screen with a destination terminal by an operator terminal, comprising the steps of:
   receiving a specified area of a predetermined area in a shared area where a screen is shared with the destination terminal;
   transmitting request data to request a change of a display format of screen data displayed in the received specified area to the destination terminal;
   receiving response data responding to the request from the destination terminal through a first communication channel being different from a second communication channel through which the screen data to be shared are transmitted, the response data being data in which the display format of the screen data is changed;
   changing the display format of the screen data displayed in the specified area based on the received response data to generate a response screen; and
   displaying the response screen together with the screen data of the specified area.

22. A method for sharing a screen with a destination terminal by an operator terminal, comprising the steps of:
   receiving an operation in a shared area where a screen is shared with the destination terminal;
   transmitting request data to request a change of a display format of screen data displayed in an area corresponding to the received operation to the destination terminal;
   receiving response data responding to the request from the destination terminal through a first communication channel being different from a second communication channel through which the screen data to be shared are transmitted, the response data being data in which the display format of the screen data is changed;
   changing the display format of the screen data displayed in the area corresponding to the received operation based on the received response data to generate a response screen; and
   displaying the response screen together with the screen data of the area corresponding to the received operation.

* * * * *